United States Patent
Kim et al.

(10) Patent No.: US 10,347,064 B2
(45) Date of Patent: Jul. 9, 2019

(54) DIGITAL DOOR LOCK SYSTEM USING WIRELESS POWER TRANSMISSION

(71) Applicant: LINKELECTRONICS CO., LTD., Gyeonggi-do (KR)

(72) Inventors: YoungSoo Kim, Gyeonggi-do (KR); Deokheon Kim, Gyeonggi-do (KR)

(73) Assignee: LINKELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/823,982

(22) Filed: Nov. 28, 2017

(65) Prior Publication Data

US 2018/0190055 A1 Jul. 5, 2018

(30) Foreign Application Priority Data

Dec. 30, 2016 (KR) .................. 10-2016-0183947

(51) Int. Cl.
*H02J 50/10* (2016.01)
*G07C 9/00* (2006.01)
(Continued)

(52) U.S. Cl.
CPC ..... *G07C 9/00309* (2013.01); *G07C 9/00174* (2013.01); *G07C 9/00563* (2013.01);
(Continued)

(58) Field of Classification Search
CPC ............................................... H02J 50/10–12
(Continued)

(56) References Cited

U.S. PATENT DOCUMENTS

2011/0199183 A1* 8/2011 Marsden ............ G07C 9/00563
340/5.52
2015/0371469 A1* 12/2015 Scalisi .................. E05B 47/026
340/5.52
(Continued)

FOREIGN PATENT DOCUMENTS

KR    20090127693    12/2009
KR    101009167      1/2011
(Continued)

*Primary Examiner* — Qutbuddin Ghulamali
(74) *Attorney, Agent, or Firm* — IPLA P.A.; James E. Bame

(57) ABSTRACT

A digital door lock system includes a receiving antenna matching unit configured to receive a power signal wirelessly transmitted from the wireless power transmitting device; a full-wave rectifying unit configured to convert a sinusoidal signal waveform outputted from the receiving antenna matching unit to one of constant polarity; a voltage regulating unit configured to stabilize a signal outputted from the full-wave rectifying unit; a secondary battery configured to supply a power in case of power outage; an excessive charging/discharging preventing unit configured to charge the secondary battery by a stabilized power of the voltage regulating unit and having an excessive charging/discharging preventing function; and a power supply unit configured to supply the power of the voltage regulating unit to the respective units of the system and to supply the power of the secondary battery to the respective units of the system in the case of power outage.

4 Claims, 2 Drawing Sheets

(51) Int. Cl.
  *H02J 7/00* (2006.01)
  *H02J 7/02* (2016.01)
(52) U.S. Cl.
  CPC ............ *H02J 50/10* (2016.02); *G07C 9/0069* (2013.01); *G07C 2009/00095* (2013.01); *G07C 2009/00642* (2013.01); *G07C 2009/00769* (2013.01); *H02J 7/0029* (2013.01); *H02J 7/025* (2013.01); *H02J 2007/004* (2013.01); *H02J 2007/0037* (2013.01)
(58) Field of Classification Search
  USPC ....................................................... 340/5.52
  See application file for complete search history.

(56) References Cited

U.S. PATENT DOCUMENTS

2016/0315506 A1* 10/2016 John .................... A61N 1/3785
2017/0338860 A1* 11/2017 Zou .......................... H02J 50/10
2018/0190055 A1* 7/2018 Kim ................... G07C 9/00309

FOREIGN PATENT DOCUMENTS

| KR | 20140077428 | 6/2014 |
| KR | 20150006560 | 1/2015 |

\* cited by examiner

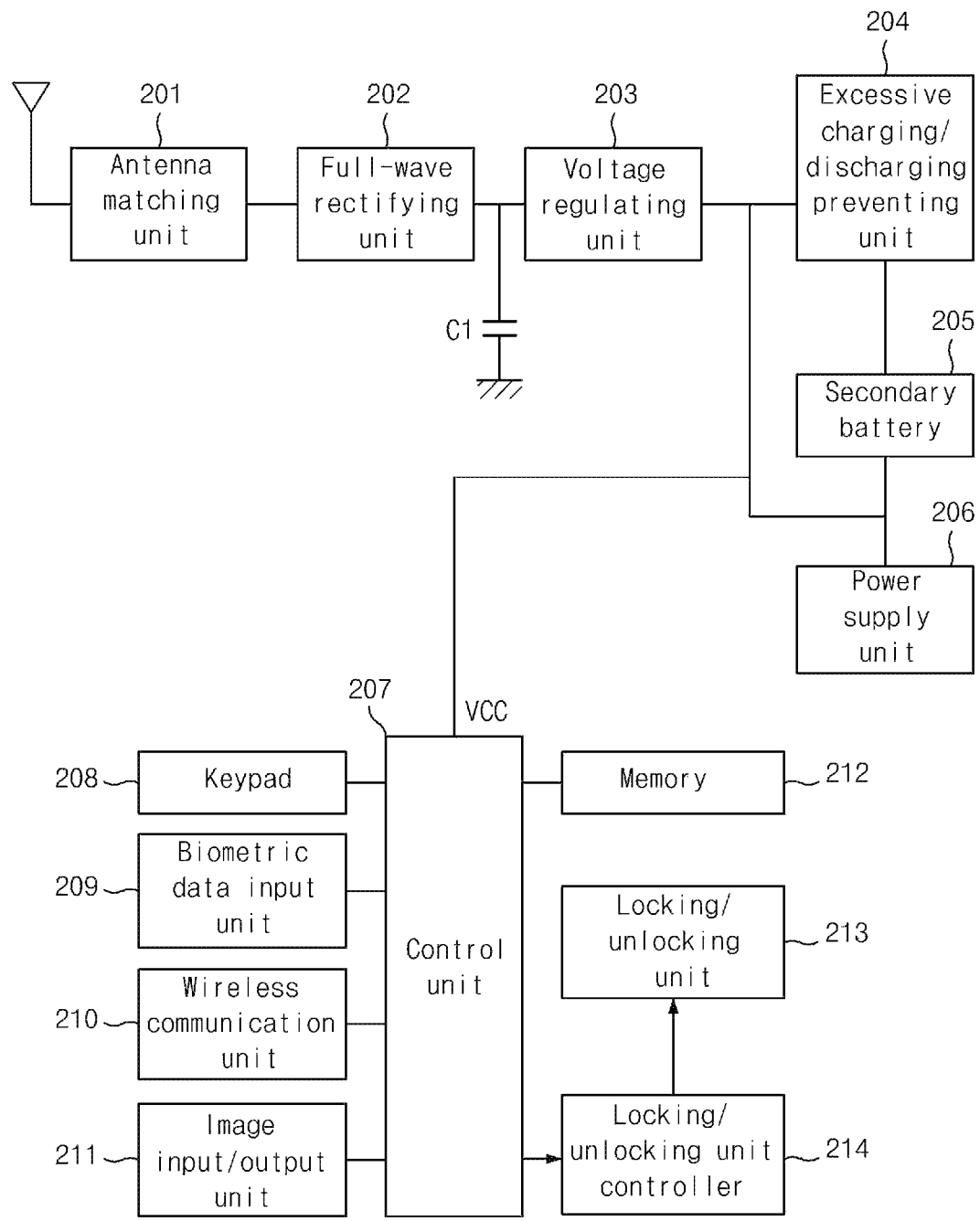

DIGITAL DOOR LOCK SYSTEM USING WIRELESS POWER TRANSMISSION

CROSS REFERENCE

The present application claims priority to Korean Patent Application No. 10-2016-0183947, filed 30 Dec. 2016, the entire contents of which is incorporated herein for all purposes by this reference.

BACKGROUND

The present invention relates to a digital door lock system, and, more particularly, to a digital door lock system capable of employing various user authentication methods by use of wireless power transmission.

In general, digital door locks are configured to allow a user access to a door through authentication that is carried out by directly inputting a preset password to the lock or that is carried by reading an RFID tag with identification number.

Recently, due to the rapidly improved electronic communication technology and the increased individual disposable properties, various authentication technologies to identify users are being developed. Specifically, identification methods are developed since there is the necessity in the field of payment or age limit, such as use limit on various added values or use limit on a variety of information. The user identification is carried out by a password previously given to the user.

Since an error will occur trying to identify the user due to disclosure of personal information, such as a password, more complicated and detailed authentication technology is recently being developed.

One of typical authentication methods is biometrics authentication using physiological characteristics, such as fingerprint, palm veins, face recognition, DNA, palm print, hand geometry, iris recognition, and retina. Specifically, additional an authentication technology is introduced to carry out the authentication by previously storing biometric data, such as fingerprint data or iris data, and comparing it with a user's biometric data. In this instance, a power should be supplied for the authentication.

However, general digital door locks have a problem in that since the digital door lock uses a DC battery, it is hardly be applied to the biometrics authentication requiring high power consumption (refer to Korean Patent No. 10-1009167).

SUMMARY OF THE INVENTION

Therefore, the present invention has been made in view of the above problem, and an object of the present invention is to provide a digital door lock system using wireless power transmission that can remarkably improve user's convenience by employing biometric authentication technology.

Another object of the present invention is to provide a digital door lock system using wireless power transmission that employs a secondary battery and charges it with wireless power, so that it does not need to replace a battery and solves a non-operated problem when the battery goes flat.

In order to achieve the above objects, there is provided a digital door lock system which is connected to a wireless power transmitting device for wireless charging, the system including: a receiving antenna matching unit configured to receive a power signal wirelessly transmitted from the wireless power transmitting device; a full-wave rectifying unit configured to convert a sinusoidal signal waveform outputted from the receiving antenna matching unit to one of constant polarity; a voltage regulating unit configured to stabilize a signal outputted from the full-wave rectifying unit; a power supply unit configured to supply the power of the voltage regulating unit to the respective units of the system.

The digital door lock system further includes a keypad through which a user inputs a password; a biometric data input unit through which the user inputs biometric data; a memory to store the biometric data or password of the user; a locking/unlocking unit configured to lock or unlock a door; a locking/unlocking unit controller configured to control the locking/unlocking unit; a control unit configured to compare information stored in the memory and the password or biometric data inputted from the keypad or the biometric data input unit, and to control locking or unlocking of the locking/unlocking unit; a secondary battery configured to supply a power in case of power outage; and an excessive charging/discharging preventing unit configured to charge the secondary battery by a stabilized power of the voltage regulating unit and having an excessive charging/discharging preventing function, wherein the power supply unit supplies the power of the secondary battery to the respective units of the system in the case of power outage.

The digital door lock system further includes a wireless communication unit configured to communicate with an exterior; and an image input/output unit having a function of inputting and outputting an image.

The wireless power transmitting device is disposed at a position near to the receiving antenna matching unit, and includes an AC/DC converter configured to convert a power inputted from an exterior to a DC current; a first constant voltage circuit configured to produce a first constant voltage from the output of the AC/DC converter; a second constant voltage circuit configured to produce a second constant voltage from the output of the AC/DC converter; an oscillator configured to oscillate the output of the second constant voltage circuit to produce a wireless power transmission frequency; an amplifier configured to amplify a bandwidth of the wireless power transmission frequency produced from the oscillator by use of the first constant voltage; and a transmission antenna matching unit configured to wirelessly radiate a wireless power transmission signal amplified by the amplifier.

The transmission antenna matching unit includes an antenna having directivity to the receiving antenna matching unit.

With the above configuration, the digital door lock system using wireless power transmission can remarkably improve user's convenience by employing biometric authentication technology.

Also, the digital door lock system using wireless power transmission employs the secondary battery and charges it with wireless power, so that it does not need to replace a battery and solves a non-operated problem when the battery goes flat.

BRIEF DESCRIPTION OF THE DRAWINGS

FIG. 2 is a bock diagram illustrating the digital door lock system according to the embodiment of the present invention.

DETAILED DESCRIPTION OF THE PREFERRED EMBODIMENT

Figure 1:
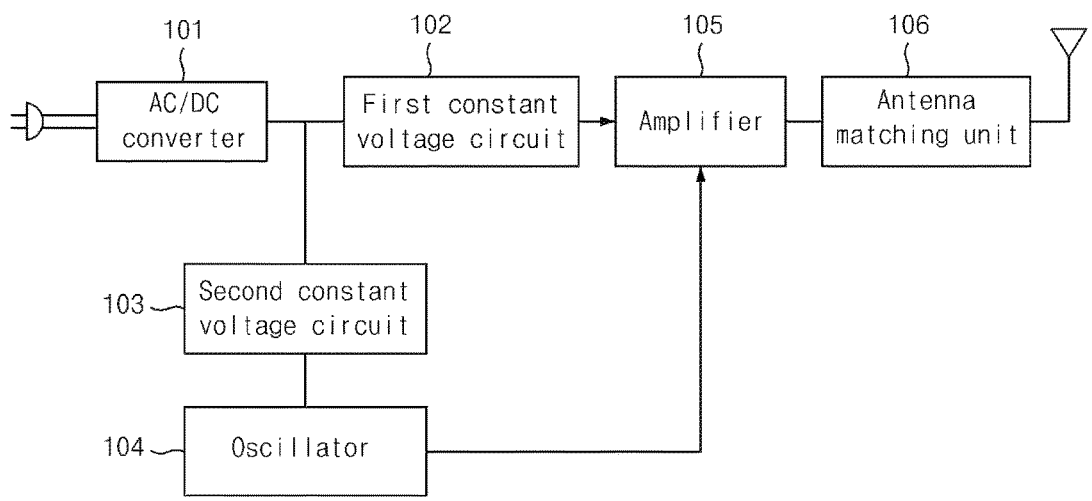
FIG. 1 is a block diagram illustrating a wireless power transmitting device of a digital door lock system according to an embodiment of the present invention.

Hereinafter, an embodiment of the present invention is explained in detail in conjunction with the accompanying drawings so that those skilled in the art can easily carry out the present invention. In the following description, like reference numerals are attached to elements identical to those throughout the embodiment, and the description thereof is omitted herein.

The terms "comprising" and "including" in the discussion directed to the present invention and the claims are used in an open-ended fashion and thus should be interrupted to mean "including", but not limited thereto.

FIG. 1 is a block diagram illustrating a wireless power transmitting device of a digital door lock system according to an embodiment of the present invention. FIG. 2 is a bock diagram illustrating the digital door lock system according to the embodiment of the present invention.

Referring to FIGS. 1 and 2, the digital door lock system which is connected to a wireless power transmitting device for wireless charging according to the embodiment of the present invention includes a receiving antenna matching unit 201 configured to receive a power signal wirelessly transmitted from the wireless power transmitting device; a full-wave rectifying unit 202 configured to convert a sinusoidal signal waveform outputted from the receiving antenna matching unit 201 to one of constant polarity; a voltage regulating unit 203 configured to stabilize a signal outputted from the full-wave rectifying unit 202; a secondary battery 205 configured to supply a power in case of power outage; an excessive charging/discharging preventing unit 204 configured to charge the secondary battery 205 by a stabilized power of the voltage regulating unit 203 and having an excessive charging/discharging preventing function; and a power supply unit 206 configured to supply the power of the voltage regulating unit 203 to the respective units of the system and to supply the power of the secondary battery 205 to the respective units of the system in the case of power outage.

The system further includes a keypad 208 through which a user inputs a password; a biometric data input unit 209 through which the user inputs biometric data; a memory 212 to store the biometric data or password of the user; a locking/unlocking unit 213 to lock or unlock a door; a locking/unlocking unit controller 214 to control the locking/unlocking unit 213; and a control unit 207 to compare information stored in the memory and the password or biometric data inputted from the keypad 208 or the biometric data input unit 209, and to control locking or unlocking of the locking/unlocking unit 213.

If necessary, the system further includes a wireless communication unit 210 to communicate with an exterior, and an image input/output unit 211 having a function of inputting and outputting an image.

The wireless power transmitting device is disposed at a position near to the receiving antenna matching unit 201, and includes an AC/DC converter 101 configured to convert a power inputted from an exterior to a DC current; a first constant voltage circuit 102 configured to produce a first constant voltage from the output of the AC/DC converter 101; a second constant voltage circuit 103 configured to produce a second constant voltage from the output of the AC/DC converter 101; an oscillator 104 configured to oscillate the output of the second constant voltage circuit 103 to produce a wireless power transmission frequency; an amplifier 105 configured to amplify a bandwidth of the wireless power transmission frequency produced from the oscillator 104 by use of the first constant voltage; and a transmission antenna matching unit 106 configured to wirelessly radiate a wireless power transmission signal amplified by the amplifier.

The transmission antenna matching unit 106 may include an antenna having directivity to the receiving antenna matching unit 201, or may be equipped with a shield in an opposite direction, if necessary.

The operation of the digital door lock system configured as described above according to the embodiment of the present invention will now be described.

First, the AC/DC converter 101 of the wireless power transmitting device receives the power, such as AC 110 volts or DC 220 volts, from the exterior, and converts it to the DC current.

The first constant voltage circuit 102 produces the first constant voltage from the output of the AC/DC converter 101, and the second constant voltage circuit 103 produces the second constant voltage from the output of the AC/DC converter 101. The second constant voltage is used as a supply voltage of the oscillator that produces the wireless power transmission frequency, and the first constant voltage uses a voltage higher that the second constant voltage. The first constant voltage is used as a drive voltage of the amplifier 105 which is an amplifying circuit to amplify the wireless power transmission frequency.

For example, the second constant voltage may use 5 volts, while the first constant voltage may select a voltage between 12 V and 30 V to be suitable for the amplifier 105.

The wireless power transmission frequency produced by the oscillator 104 by the second constant voltage of the second constant voltage circuit 103 is amplified by the amplifier 105, and then is radiated through the receiving antenna matching unit 106 and the antenna. In this instance, a directional antenna is used, or the antenna is equipped with the shield at a rear side thereof, so that a lot of signals are emitted to the receiving antenna. The transmission antenna matching unit 106 may include the antenna having the directivity to the receiving antenna matching unit 201, or may be equipped with the shield at the rear side thereof, if necessary.

The receiving antenna matching unit 201 receives the power signal wirelessly sent from the wireless power transmitting device.

The received wireless power transmission signal is outputted in a sinusoidal pattern from the receiving antenna matching unit 201, and the voltage is stabilized by a C1 condenser of the full-wave rectifying unit 202 of a bridge diode type.

The voltage regulating unit 203 stabilizes the signal outputted from the full-wave rectifying unit 202 to send it to the control unit, the power supply unit and the excessive charging/discharging preventing unit 204.

The excessive charging/discharging preventing unit 204 charges the secondary battery 205 by the stabilized power of the voltage regulating unit 203, and can stably charge the secondary battery since the excessive charging/discharging preventing unit has the excessive charging/discharging preventing function.

Also, the power supply unit 206 supplies the power of the voltage regulating unit 203 to the respective units of the system, while supplies the power of the secondary battery 205 to the respective units of the system in the case of power outage.

The stable power supply can be achieved by the above process.

In this instance, a user who returns from a visit can input the password by operating the keypad 208 according to the manner previously registered, or can input the biometric data by approaching his or her body to the biometric data input unit 209, in order to open the door. The biometric data includes at least any one of fingerprint, palm veins, face recognition, DNA, palm print, hand geometry, iris recognition, and retina. In the case of the fingerprint, a finger is brought into contact with the biometric data input unit 209. In the case of the face recognition or the iris recognition, the face or the pupil of the eye comes close to the biometric data input unit 209.

If the password or the biometric data is inputted by the keypad 208 or the biometric data input unit 209, the control unit 207 compares the information stored in the memory and the password or biometric data inputted from the keypad 208 or the biometric data input unit 209 to control locking or unlocking of the locking/unlocking unit 213. Specifically, if the information stored in the memory is identical to the password or biometric data inputted from the keypad 208 or the biometric data input unit 209, the locking/unlocking unit 213 is released to open the door. If it is not identical to each other, the locking/unlocking unit 213 is not released.

The locking/unlocking unit controller 214 controls the operation of the locking/unlocking unit 213 under the control of the control unit 207, so that the door is locked or unlocked by the locking/unlocking unit 213.

Since the present invention employs the secondary battery 205, there is no concern about the discharge of the battery. Therefore, it can be applied to digital door lock systems having various functions which consume the power.

If necessary, the system includes the wireless communication unit 210 to communicate with the exterior, so that the device can communicate with the exterior under the control of the control unit 207.

In addition, the system includes the image input/output unit 211 having the function of inputting and outputting the image, so that it can take a photograph of a person standing outside the door for the purpose of the face recognition, or can provide a user with the picture.

According to the embodiment of the present invention, the technology of transmitting the wireless power is applied to the digital door lock system that can remarkably improve user's convenience by employing biometric authentication technology.

In addition, according to the embodiment of the present invention, the digital door lock system using the wireless power transmission employs the secondary battery that is wirelessly charged, so that there is no need to replace the battery and solve a non-operated problem when the battery goes flat.

The above-described embodiment of the present invention is not realized only by the device and method, but can be realized by a program for executing functions corresponding to the components of the embodiment or a recordable medium recorded with the program. Those skilled in the art can easily carry out the above realization from the above description of the embodiment.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A digital door lock system, which is connected to a wireless power transmitting device for wireless charging, the digital door lock system comprising:
   a receiving antenna matching unit configured to receive a power signal wirelessly transmitted from the wireless power transmitting device;
   a full-wave rectifying unit configured to convert a sinusoidal signal waveform outputted from the receiving antenna matching unit to one of constant polarity;
   a voltage regulating unit configured to stabilize a signal outputted from the full-wave rectifying unit; and
   a power supply unit configured to supply the power of the voltage regulating unit to the respective units of the system,
   wherein the wireless power transmitting device is disposed at a position near to the receiving antenna matching unit, and comprises:
   an AC/DC converter configured to convert a power inputted from an exterior to a DC current;
   a first constant voltage circuit configured to produce a first constant voltage from the output of the AC/DC converter;
   a second constant voltage circuit configured to produce a second constant voltage from the output of the AC/DC converter;
   an oscillator configured to oscillate the output of the second constant voltage circuit to produce a wireless power transmission frequency;
   an amplifier configured to amplify a bandwidth of the wireless power transmission frequency produced from the oscillator by use of the first constant voltage; and
   a transmission antenna matching unit configured to wirelessly radiate a wireless power transmission signal amplified by the amplifier.

2. The digital door lock system according to claim 1, further comprising:
   a keypad through which a user inputs a password;
   a biometric data input unit through which the user inputs biometric data;
   a memory to store the biometric data or password of the user;
   a locking/unlocking unit configured to lock or unlock a door;
   a locking/unlocking unit controller configured to control the locking/unlocking unit;
   a control unit configured to compare information stored in the memory and the password or biometric data inputted from the keypad or the biometric data input unit, and to control locking or unlocking of the locking/unlocking unit;
   a secondary battery configured to supply a power in case of power outage; and
   an excessive charging/discharging preventing unit configured to charge the secondary battery by a stabilized power of the voltage regulating unit and having an excessive charging/discharging preventing function,
   wherein the power supply unit supplies the power of the secondary battery to the respective units of the system in the case of power outage.

3. The digital door lock system according to claim 2, further comprising:
   a wireless communication unit configured to communicate with an exterior; and
   an image input/output unit having a function of inputting and outputting an image.

4. The digital door lock system according to claim 1, wherein the transmission antenna matching unit includes an antenna having directivity to the receiving antenna matching unit.

* * * * *